Figure 1:
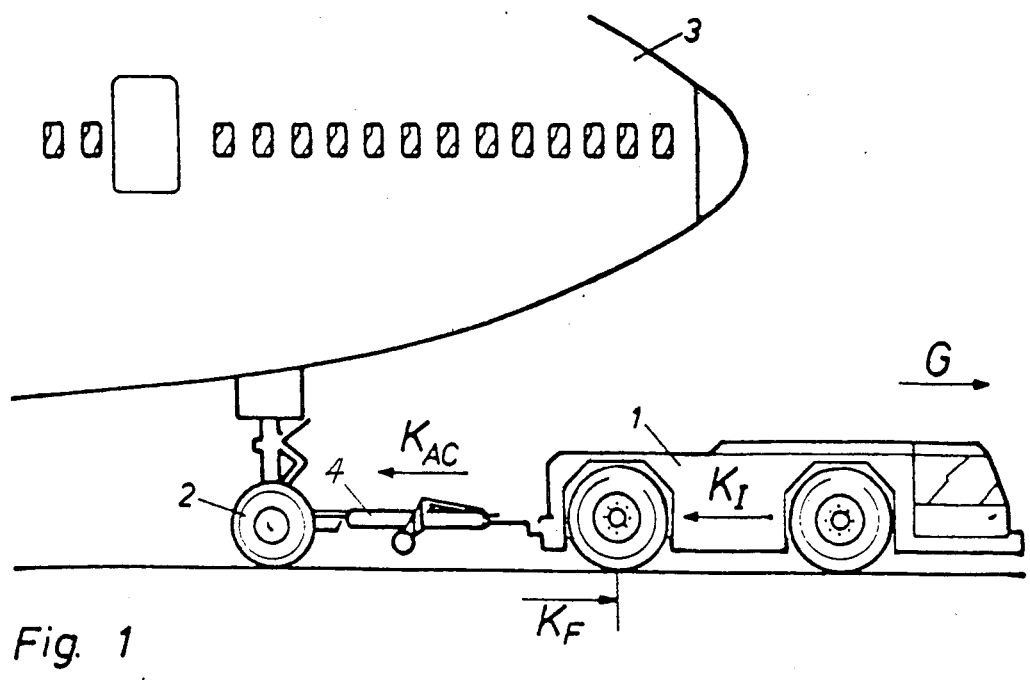

United States Patent [19]

Birkeholm

[11] Patent Number: 5,048,625

[45] Date of Patent: Sep. 17, 1991

[54] METHOD FOR PREVENTING OVERLOADING OF NOSE WHEEL GEARS OF AIRCRAFT BEING TOWED BY A TRACTOR AND TRACTOR FOR CARRYING OUT THE METHOD

[76] Inventor: Mogens Birkeholm, Kagsaavej 59, Herlev, Denmark, 2730

[21] Appl. No.: 469,459
[22] PCT Filed: Oct. 10, 1988
[86] PCT No.: PCT/DK88/00165
 § 371 Date: Apr. 11, 1990
 § 102(e) Date: Apr. 11, 1990
[87] PCT Pub. No.: WO89/03343
 PCT Pub. Date: Apr. 20, 1989

[30] Foreign Application Priority Data

Oct. 14, 1987 [SE] Sweden ............................ 8703984

[51] Int. Cl.$^5$ ............................................ B62D 53/00
[52] U.S. Cl. .................................. 180/14.6; 180/904; 364/426.01
[58] Field of Search ............... 180/14.6, 14.1, 14.5, 180/904, 282; 280/449; 364/566, 426.01, 426.05; 73/862.57, 862.38, 493; 172/2, 7, 3

[56] References Cited

U.S. PATENT DOCUMENTS

| | | | |
|---|---|---|---|
| 2,521,503 | 9/1950 | Clark | 172/7 |
| 2,790,365 | 4/1957 | Bunting | 73/493 |
| 3,005,509 | 10/1961 | Nolan | 180/11 |
| 4,070,562 | 1/1978 | Kuno et al. | 364/566 |
| 4,113,041 | 9/1978 | Birkeholm | 180/14 C |
| 4,225,279 | 9/1980 | Boyer | 414/428 |
| 4,232,372 | 11/1980 | Berent | 364/566 |
| 4,375,244 | 3/1983 | Morin | 180/14.7 |
| 4,627,011 | 12/1986 | Spencer | 364/566 |
| 4,723,078 | 2/1988 | Neuffer et al. | 180/282 |

FOREIGN PATENT DOCUMENTS

WO85/00790 2/1985 World Int. Prop. O. .

OTHER PUBLICATIONS

FAN, Henry S. L. and HANEY, Dan G., AIRCRAFT TOWING FEASIBILITY STUDY, Paper Presented at Symposium on Commercial Aviation Energy Conservation Strategies, Apr. 2-3, 1981, Cosponsored by U.S. Department of Energy and Federal Aviation Administration (DOE/FAA).

Primary Examiner—Charles A. Marmor
Assistant Examiner—Anne M. Boehler
Attorney, Agent, or Firm—Kenyon & Kenyon

[57] ABSTRACT

When towing large aircraft with a tractor damage may at high speeds inadvertently be done to the nose wheel gears of the aircraft if the pilots of the aircraft apply the brakes. This can be avoided by automatic control whereby the transmitted force is sensed and the power and braking of the tractor is controlled on the basis of said sensing. By tractors of that kind it is difficult to sense the transmitted power directly. Instead, according to the invention, the acceleration of the tractor and the supplied power of the tractor are sensed. On the basis thereof it is possible to calculate the transmitted force and to drive accordingly.

10 Claims, 2 Drawing Sheets

METHOD FOR PREVENTING OVERLOADING OF NOSE WHEEL GEARS OF AIRCRAFT BEING TOWED BY A TRACTOR AND TRACTOR FOR CARRYING OUT THE METHOD

The invention relates to a method for preventing overloading of nose wheel gears of aircraft being towed by a tractor.

The specification of U.S. Pat. No. 4,113,041 describes a method and a control system whereby the force being transmitted between tractor and aircraft is continuously sensed and whereby subsequently on the basis of the sensed value the braking and the output effect of the tractor are controlled in a superior manner so that the transmitted force is kept within a pre-determined interval. Using this system it is possible for the pilots of the aircraft to brake by means of the brakes of the aircraft in that the tractor will always automatically follow the aircraft in its acceleration and deceleration. The system is applicable when using a towbar and in connection with that type of tractors where the nose wheel of the aircraft is supported on the tractor. This type of tractor has spread and it has thus turned out that the nose wheel gears have such great strength that it is actually possible without the mentioned automatic control link with the aircraft to decelerate the tractor from speeds of 30 km/h without damaging said gears. This is among other things due to the fact that the tractor will not necessarily have to be so big when the nose wheel is supported thereon. When the nose wheel is supported on the tractor, it is not quite so easy to sense the transmitted pulling force, ie. to register when the aircraft is braking.

It is the object of the present invention to provide a more simple method of sensing than just measuring the transmitted force.

The characteristic feature of the method is that the acceleration or deceleration in longitudinal direction of the tractor is continuously sensed, and that the values obtained are used for reducing the power supplied by the tractor and if required to activate the brakes of the tractor if a deceleration above a certain value is sensed.

It is thereby possible to carry out the towing at a speed above 30 km/h without involving any danger to the nose wheel gears.

The method may moreover be characteristic in that the power is zeroed if there is a deceleration or perhaps a deceleration of a certain value. If the engine power of the tractor is fully disconnected when the aircraft brakes, the nose wheel gears will solely have to absorb the inertia forces originating from the tractor and that will be acceptable by smooth brakings and by large aircraft.

By further improvements in the method these forces are fully compensated for since the method is characteristic in that a value being a function of the supplied power of the tractor, for example the moment on the drive shafts or the fuel consumption, is also continuously sensed, that on the basis of the sensed values and the mass of the tractor the pulling force transmitted to the aircraft is continuously calculated, and that the power or braking of the tractor is controlled in such a manner that the pulling force is constantly kept within a pre-determined, permissible interval.

According to the invention an interval of solely positive forces, ie. pulling forces between tractor and aircraft will preferably be chosen. There is thus guarded against the socalled jack knifing which may be very dangerous by overrun, ie. if the aircraft for example due to wind forces or variations in the ground, happens to run faster than the tractor ie. tries to push the tractor. The method of the invention will in that case forestall such incident and provide an acceleration of the tractor. This fact is of course of vital importance on slippery runways.

The invention also relates to a tractor for carrying out the method and this tractor is characterised by being equipped with an accelerometer for sensing in longitudinal direction. The driver of the tractor can then when reading the accelerometer take the required measures for reducing the speed of the tractor. Usually such a tractor will be equipped with constant speed control for the engine or the engines and there will be fixed settings of the power, ie. the driver will not be required to depress an accelerator as in a car. By listening to the engine or the engines the driver will therefore have a clear indication of suddenly increased power and will then on this background be able to take measures.

To facilitate this procedure the tractor may, however, be characteristic in that the accelerometer is linked with an acoustic or visual alarm signaller which serves to give the alarm when the deceleration of the tractor exceeds a definite, pre-set value.

A preferred embodiment is, however, characteristic in that the accelerometer is linked with a signaller which serves to disconnect the engine power when the deceleration of the tractor exceeds a definite, pre-set value. There is thus achieved complete certainty that a disconnection of the engine will take place.

Another embodiment is characteristic in that a control unit which on the basis of the sensed values, ie. the power supplied by the tractor to the wheels and acceleration or deceleration, and the fixed values, ie. the mass of the tractor and the effect curve or power characteristics of the engine serves to calculate the pulling force transmitted to the aircraft which control unit in a superior manner serves to control the power and if desired braking of the tractor in such a manner that the pulling force transmitted to the aircraft will never exceed a pre-set value.

A further improvement of this embodiment is characteristic in that the control unit in a superior manner also serves to control the power and braking of the tractor in such a manner that the pulling force transmitted to the aircraft will never fall below a pre-set value, preferably a positive value.

There is thus provided automatic control which takes all constituent factors into account and therefore securely protects the nose wheel gears against impermissible forces.

The invention will be further explained with reference to the drawing, wherein

Figure 3:
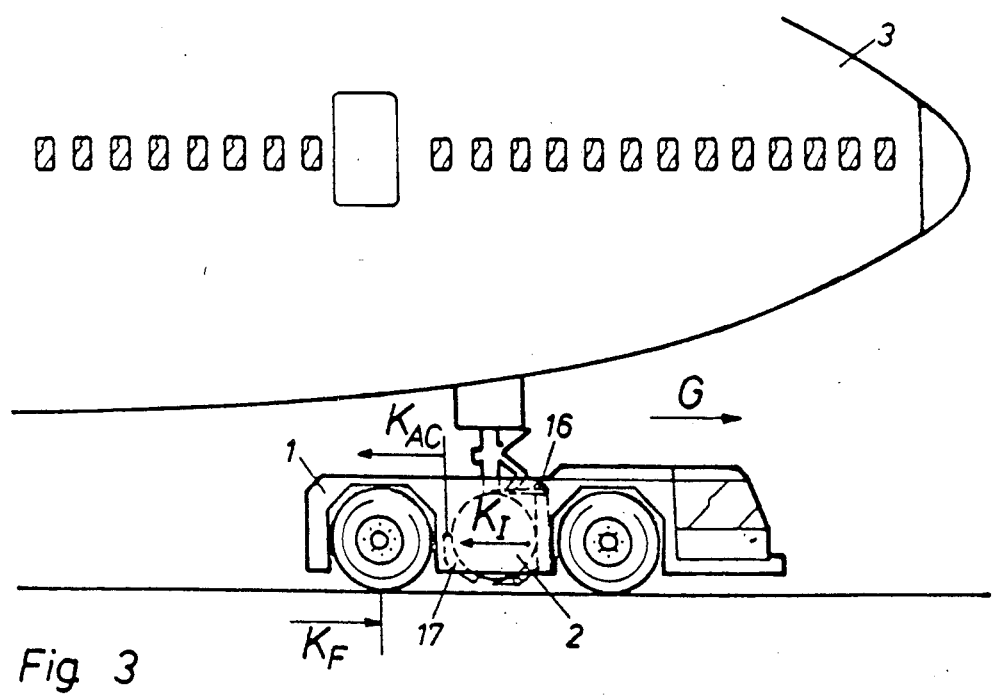
Figure 2:
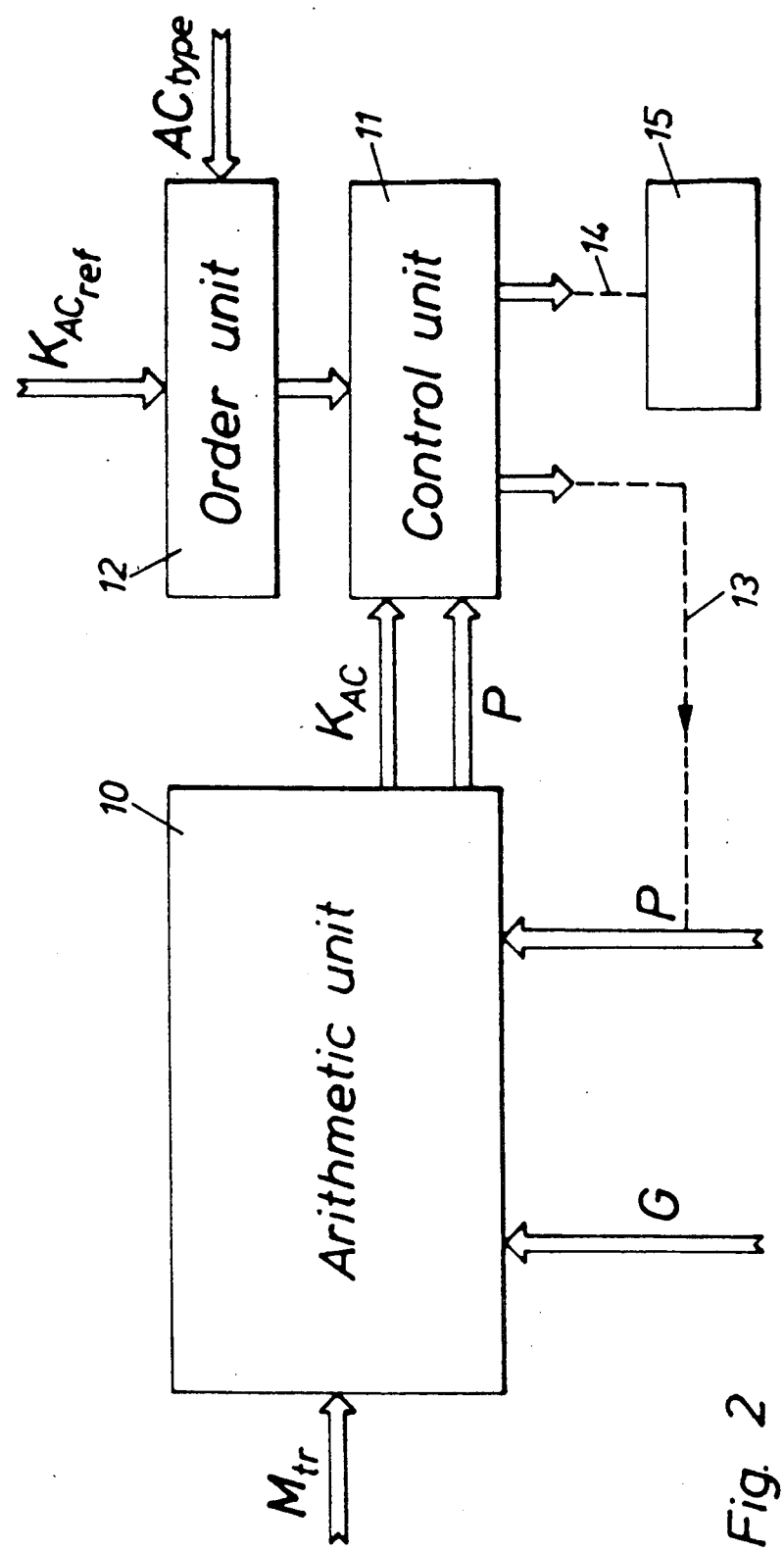

FIG. 1 is a side view of a tractor which is connected to an aircraft, shown in part only, by means of a towbar, FIG. 2 is a diagram illustrating a possible processing of the input values, and FIG. 3 is the same as in FIG. 1 but the nose wheel of the aircraft is supported on the tractor.

FIG. 1 shows a tractor 1 connected to a nose wheel 2 of an aircraft 3 by means of a towbar 4. It is stressed that the nose wheel of the aircraft 2 could also have been supported on the tractor 1. The figure now shows the forces by which the tractor 1 is influenced when the tractor accelerates forward with an acceleration G considered positive in the shown direction. Under these circumstances the tractor will firstly in its centre of gravity be influenced by an inertia force equal to the mass of the tractor multiplied by its acceleration:

$$K_I = M_{tr} \times G$$

The case is contemplated where it is the engine of the tractor which gives rise to the mentioned acceleration and this will then imply that the tractor is influenced by a forwardly directed friction force from the underlying base: $K_F$. In the towbar 4 the aircraft 3 will under these circumstances give rise to a rearwardly directed force $K_{AC}$. This quantity is so far unknown.

The forces influencing the tractor will at any time be in equilibrium and therefore the following equation will apply:

$$K_I + K_{AC} = K_F$$

However, as mentioned above $K_I M_{tr} - G$ and $K_F = f(P)$ where P is the engine power. It is thus evident that the unknown quantity $$K_{AC} = f(P) - M_{tr} \times G$$

The quantity f(P) may be replaced by f(M) where M is the sum of the moments on the drive shafts of the tractor. The correlation between $K_F$ and P and M, respectively, can easily be found by tests. The mass of the tractor is constant, ie. if G is sensed, it is possible at any time to calculate $K_{AC}$ which is in fact the interesting quantity which is decisive for whether the nose wheel gears 4 are overloaded.

The explained correlation can be illustrated by a typical situation where the towing takes place at a speed of 50 km/h on a runway that slopes a little so that the tractor will not have to supply any power, ie. f(P)=0. Hence again $$K_{AC} = -M_{tr} \times G$$

If the pilots of the aircraft under these circumstances decide to brake by means of the brakes of the aircraft, this will of course result in $K_{AC}$ increasing. This will result in a negative G since as mentioned $$K_{AC} = M_{tr} \times G$$

It is therefore possible to register the suddenly increased $K_{AC}$ by sensing G. On the basis of this sensing it is thus possible to brake with the brakes of the tractor so that $K_{AC}$ keeps within a permissible interval.

Everything considered it is of course possible at any time on the basis of a sensing of the engine power of the tractor and the sensed acceleration of the tractor to calculate $K_{AC}$. On the basis of a continuous calculation of this quantity it is thus possible also to control this quantity by regulating the power supplied by the tractor and/or the braking. This may for example be done as shown in the flow chart in FIG. 2.

The G of the tractor sensed by an accelerometer is entered into an arithmetic unit 10. Entered is moreover the supplied power P of the tractor or the moment M being the sum of moments on the drive shafts of the tractor 1. The arithmetic unit 10 the continuously calculates $K_{AC}$ on the basis of the formula:

$$K_{AC} = f(P \text{ or } M) - M_{tr}G$$

$K_{AC}$ is then together with P led to a control unit 11 which is given the desired $K_{AC}$ from an order unit 12 in the form of a reference value $K_{ACref}$. This value will depending on the type of aircraft be subjected to limitations which are entered into the order unit 12. Both values are entered by the operator of the tractor. $K_{ACref}$ can while driving be changed by the operator for example by means of a throttle control.

The control unit 11 performs its function through the loop 13 regulating power P in such a manner that $K_{AC} - K_{ACref} = 0$. If power P has been reduced to 0 and $K_{AC}$ is still too big, regulation will have to be made by suitable braking with the brakes of the tractor as indicated by the line 14 and the block 15. It is again stressed that the power P may everywhere by replaced by the total moment supplied by the engine. There are many methods of sensing the power P or the moment M in that many values are proportionate to the power or have a well-defined correlation therewith. The flow rate of the supplied fuel will thus by the power characteristics of the engine make it possible to calculate the power on the basis of the immediate fuel supply. Very often the engine will drive a pump which then via hydraulic driving engines turns the individual drive shafts. In that case it is possible to calculate the supplied power by sensing the hydraulic pressure and the flow rate in the hydraulic pipes.

It is finally stressed that the invention is not limited to tractors with towbar but that it will also find use in connection with the type of tractors where the nose wheel of the aircraft is supported on the tractor. Actually, it is particularly in connection with such tractors that the invention is to a high degree applicable because under such circumstances it is difficult to sense the force transmitted to the aircraft.

FIG. 3 is an example thereof and the parts have the same reference numerals as in FIG. 1 but there is moreover shown means 16 and 17 for retaining the nose wheel 2. The forces by which the tractor 1 is influenced are the same.

What is claimed is:

1. A method for preventing overloading a nose wheel gear of an aircraft being towed by a tractor, the method comprising:
   continuously sensing acceleration of the tractor in the longitudinal direction of the tractor;
   continuously sensing a value that is a function of power supplied to drive wheels of the tractor;
   continuously calculating values of a pulling force transmitted to an aircraft nose wheel gear from the tractor as a function of the sensed values of acceleration and tractor power and a predetermined value of tractor mass; and
   controlling the power supplied to the wheels of the tractor and braking of the tractor in response to the sensed tractor acceleration to maintain the calculated values of the pulling force within a preselected permissible range.

2. The method of claim 1 wherein the step of sensing a value that is a function of power supplied to wheels of the tractor comprises sensing torque applied to drive shafts of the tractor wheels.

3. The method of claim 2 wherein the step of sensing a value that is a function of power supplied to wheels of the tractor comprises sensing fuel consumption of the tractor.

4. The method of claim 1 wherein the preselected range of calculated values of the pulling force transmitted from the tractor to the nose wheel gear of the aircraft includes only positive values of said force in the forward direction.

5. The method of claim 1 wherein the step of controlling the power supplied to the tractor wheels in response to the sensed tractor acceleration comprises setting the supplied power to zero if the sensed acceleration is negative, in reference to the forward direction, and has an absolute value greater than a preselected threshold value.

6. The method of claim 5 wherein the preselected threshold value of negative acceleration is zero.

7. A tractor for towing aircraft, the tractor having means for applying a pulling force to a nose wheel gear of an aircraft, at least one engine, drive wheels, means for supplying power from the engine as torque to the drive wheels, means for braking the tractor, and means for controlling the engine output and the braking means, wherein the controlling means comprises:
  an accelerometer mounted in the tractor for continuously sensing acceleration in the longitudinal direction;
  means for continuously sensing a value that is a function of power supplied from the engine to the drive wheels;
  means for continuously calculating values of a pulling force transmitted to a nose wheel gear of an aircraft from the pulling force applying means in response to signals from the accelerometer and the power sensing means and to an input value of tractor mass; and
  means for regulating the power output of the engine and for actuating the braking means so that the calculated pulling force is maintained within a preselected range.

8. The tractor of claim 7 wherein the means for regulating the power output of the engine disconnects the engine power in response to a negative acceleration output from the accelerometer that is greater than a preselected threshold value.

9. The tractor of claim 7 further comprising an acoustic alarm signaller that is actuated in response to a negative acceleration output from the accelerometer that is greater than a preselected threshold value.

10. The tractor of claim 7 further comprising a visual alarm signaller that is actuated in response to a negative acceleration output from the accelerometer that is greater than a preselected threshold value.

* * * * *

UNITED STATES PATENT AND TRADEMARK OFFICE
CERTIFICATE OF CORRECTION

PATENT NO. : 5,048,625
DATED : September 17, 1991
INVENTOR(S) : Mogens BIRKEHOLM It is certified that error appears in the above-identified patent and that said Letters Patent is hereby corrected as shown below:

Column 3, line 18, change "$K_I M_{tr-} G$" to --$K_I = M_{tr} \times G$--.

Column 3, line 62, change "the" to --then--.

Signed and Sealed this

Ninth Day of March, 1993

*Attest:*

STEPHEN G. KUNIN

*Attesting Officer*     *Acting Commissioner of Patents and Trademarks*